United States Patent [19]

Hashimoto et al.

[11] 4,408,655

[45] Oct. 11, 1983

[54] HEAT PIPE

[75] Inventors: Michitaka Hashimoto; Koichiro Fukui, both of Tochigi, Japan

[73] Assignee: Showa Aluminum Corporation, Osaka, Japan

[21] Appl. No.: 330,474

[22] Filed: Dec. 14, 1981

[30] Foreign Application Priority Data

Nov. 18, 1981 [JP] Japan .................................. 56-185906

[51] Int. Cl.³ .......................................... F28D 15/00
[52] U.S. Cl. ................................ 165/104.27; 165/133; 252/68
[58] Field of Search .............. 165/133, 104.21, 104.27; 252/67, 68

[56] References Cited

FOREIGN PATENT DOCUMENTS

| 37593 | 10/1978 | Japan | 165/104.27 |
| 109650 | 8/1979 | Japan | 165/104.27 |
| 109651 | 8/1979 | Japan | 165/104.27 |
| 41360 | 3/1980 | Japan | 165/104.27 |

Primary Examiner—Albert W. Davis, Jr.
Attorney, Agent, or Firm—Armstrong, Nikaido, Marmelstein & Kubovcik

[57] ABSTRACT

A heat pipe comprising an iron container having enclosed therein an aqueous solution of a vanadate as a working liquid.

5 Claims, 1 Drawing Figure

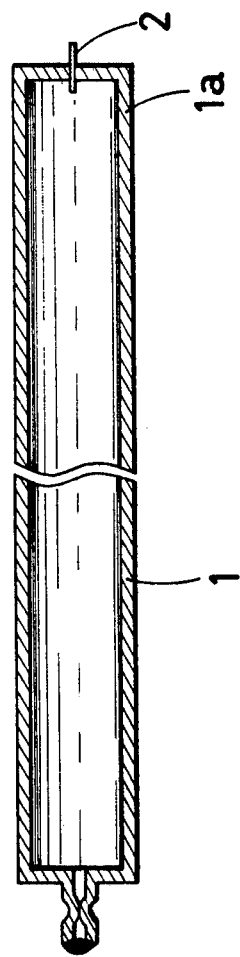

HEAT PIPE

BACKGROUND OF THE INVENTION

The present invention relates to a heat pipe for use in waste heat recovering apparatus and the like, and more particularly to an iron heat pipe which is usable for a prolonged period of time without entailing a reduction in performance.

Heat pipes made of iron are usable over a wide range of operating temperatures including low temperatures (70° to 130° C.) and high temperatures (200° to 400° C.), less costly than those made of copper and fully satisfactory also in respect of strength. Accordingly they have found wide use. The working liquid most suitable for such heat pipes is water because water is usable over a wide range of operating temperatures and has high latent heat of evaporation (540 cal/g) and limiting heat flow (109 W/cm$^2$). However, when water is used as the working liquid for an iron container serving as a heat pipe, the water reacts with iron to evolve hydrogen gas. The hydrogen gas diffuses in the form of stoms into the wall of the iron container and is partly released from the container at a constant rate, but a major portion of the hydrogen gas remains in the condensing portion of the container therein, consequently impairing the performance of the heat pipe. In view of this problem, it has been practice to use alkaline aqueous solutions, such as NaOH aqueous solution, as working liquids and containers formed with a corrosion preventing coating of $Fe_3O_4$ on the inner surface. However, the coating is not fully satisfactory, permitting corrosion of the container inner surface and allowing the evolution of hydrogen gas to some extent. It is therefore impossible to limit the rate of evolution of hydrogen gas to a level not higher than the rate of release of the gas from the container and to prevent hydrogen gas from remaining within the container.

SUMMARY OF THE INVENTION

The object of the present invention, which has been accomplished in view of the above situation, is to provide a heat pipe which is free of the likelihood that hydrogen gas will remain in its interior to result in a reduced efficiency.

The heat pipe of this invention comprises an iron container having enclosed therein an aqueous solution of a vanadate as a working liquid.

BRIEF DESCRIPTION OF THE DRAWINGS

The drawing is a view in vertical section showing a heat pipe.

DESCRIPTION OF THE PREFERRED EMBODIMENT

Examples of iron containers useful for providing heat pipes according to the present invention are containers made of stainless steel, carbon steel or the like and such containers having an aluminized coating on the outer surface.

Examples of useful vanadates are ammonium metavanadate, sodium metavanadate, potassium metavanadate, lithium metavanadate, etc., to which this invention is not limited. The aqueous solution of such a vanadate, when enclosed in the container, forms on the inner surface of the container a compact coating having high resistance to corrosion. The concentration of the vanadate is preferably 0.1% to the saturation concentration. When having a concentration of less than 0.1%, the solution fails to form a corrosion-resistant coating of sufficient thickness.

The aqueous solution of vanadate may be formed first by dissolving the vanadate in water treated by ion exchange and then placed into the container, or may be prepared within the container by placing the vanadate into the container first and then pouring such water into the container. When the container having the working liquid enclosed therein is heat-treated at a high temperature of 160° to 200° C., the formation of the corrosion-resistant coating can be accelerated.

With the heat pipe of this invention, slight corrosion is likely to occur on the inner surface of the container to evolve a small amount of hydrogen gas. The rate of evolution of the gas is nevertheless lower than the rate at which the hydrogen gas diffuses through the wall of the container and flows out from the container. The amount of the gas evolved is therefore not so large as to impair the performance of the heat pipe. To release the small amount of hydrogen thus evolved, it is desired that the heat pipe container 1 be provided, at one end 1$a$ thereof forming the condensing portion, with a linear hydrogen-permeable member 2 of palladium or an alloy thereof extending through the end and brazed thereto with silver as illustrated in the drawing. The provision of the hydrogen-permeable member 2 is effective especially when the iron container is externally aluminized for the purpose of rendering the container resistant to corrosion and attaching aluminum fins having a brazing layer to the container by vacuum brazing, because the hydrogen gas diffusing through the container wall will then be prevented from flowing out by the aluminized coating. Further since the hydrogen-permeable member is linear and extends from the interior of the container to the outside thereof through its wall, the corrosion of the container that would result from the action of electric cell between the member and the container wall can be inhibited to the greatest possible extent.

EXAMPLE

A pipe of STB 35 steel was prepared which had a diameter of 27.2 mm, a length of 1000 mm and a wall thickness of 1.6 mm. An end wall having a palladium wire extending therethrough was welded to one end of the pipe to close the end. The pipe was then aluminized only over the outer surface. The interior of the pipe was cleaned with nitric acid and then with acetone. An end wall having a working liquid injecting nozzle was welded to the other end of the pipe. Aluminum fins having a brazing layer were attached by vacuum brazing to the heat pipe container thus made. About 0.6 g of ammonium metavanadate was placed into the container, 120 ml of water subjected to ion exchange was placed into the container, and the nozzle was closed, whereby a finned heat pipe was prepared. Three finned heat pipes were further prepared in the same manner as above except that aqueous solutions of ammonium metavanadate having concentrations of 1%, 3% by weight and saturation were used as working liquids. The four heat pipes thus obtained were tested for a prolonged period of time to find that the temperature difference $\Delta T$ between the evaporating portion and the condensing portion of each pipe remained zero, hence no reduction whatsoever in efficiency. In contrast, when heat pipes were tested with use of an aqueous solution of sodium hydroxide and ion-exchanged water, the pipes exhibited greatly increasing ΔT with time, i.e. a markedly reduced efficiency.

What is claimed is:

1. A heat pipe comprising an iron container having enclosed therein an aqueous solution of a vanadate as a working liquid.

2. A heat pipe as defined in claim 1 wherein the vanadate is a salt selected from the group consisting of ammonium metavanadate, sodium metavanadate, potassium metavanadate and lithium metavanadate.

3. A heat pipe as defined in claim 1 wherein the aqueous vanadate solution has a concentration of 0.1% to saturation concentration.

4. A heat pipe as defined in claim 1 wherein a hydrogen-permeable member of palladium or an alloy thereof extends through its condensing portion.

5. A heat pipe as defined in claim 1 wherein the iron container has an aluminized coating over the outer surface thereof, aluminum fins, the aqueous vanadate solution enclosed in its interior and a hydrogen-permeable member extending through the condensing portion of the pipe.

* * * * *